US009792231B1

(12) United States Patent
Thompson et al.

(10) Patent No.: US 9,792,231 B1
(45) Date of Patent: Oct. 17, 2017

(54) COMPUTER SYSTEM FOR MANAGING I/O METRIC INFORMATION BY IDENTIFYING ONE OR MORE OUTLIERS AND COMPARING SET OF AGGREGATED I/O METRICS

(71) Applicant: Amazon Technologies, Inc., Seattle, WA (US)

(72) Inventors: James Michael Thompson, Seattle, WA (US); Marc Stephen Olson, Bellevue, WA (US); Jeevan Shankar, Amherst, MA (US); Danny Wei, Seattle, WA (US); John Robert Smiley, Issaquah, WA (US); John Luther Guthrie, II, Bellevue, WA (US); Nachiappan Arumugam, Seattle, WA (US); Benjamin Arthur Hawks, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 276 days.

(21) Appl. No.: 14/571,183

(22) Filed: Dec. 15, 2014

(51) Int. Cl.
*G06F 13/16* (2006.01)
*H04L 29/08* (2006.01)
*H04L 12/26* (2006.01)
*G06F 9/50* (2006.01)

(52) U.S. Cl.
CPC .......... *G06F 13/1642* (2013.01); *H04L 67/10* (2013.01); *G06F 9/5061* (2013.01); *H04L 43/028* (2013.01)

(58) Field of Classification Search
CPC . G06F 9/5061; G06F 13/1642; H04L 43/028; H04L 637/10
USPC ........................................................ 709/224
See application file for complete search history.

(56) References Cited

U.S. PATENT DOCUMENTS

| | | | |
|---|---|---|---|
| 8,122,124 B1* | 2/2012 | Baumback | H04L 67/22 709/217 |
| 2012/0226804 A1* | 9/2012 | Raja | H04L 43/028 709/224 |
| 2012/0233322 A1* | 9/2012 | Baumback | G06F 9/5061 709/224 |

* cited by examiner

*Primary Examiner* — Tammara Peyton
(74) *Attorney, Agent, or Firm* — Knobbe, Martens, Olson & Bear, LLP

(57) ABSTRACT

Systems and methods are described for dynamically detecting outliers in a set of input/output (I/O) metrics collected and aggregated by a storage volume network. An I/O request is received by a storage volume network, and an agent of the storage volume network associates primary and secondary identifiers with that I/O request. For example, a trace may be associated with a request to write data to a storage volume network, and spans may be associated with the individual operations required to fulfill that request. Once gathered, I/O metrics may be aggregated based on the associated identifiers. I/O metric information regarding outliers may be received from the storage volume network, processed, and published by an I/O metrics service to identify the outliers among the primary and secondary identifiers. These outliers may then be stored for further analysis, and may be utilized to determine improvements to the performance of a storage volume network.

24 Claims, 9 Drawing Sheets

COMPUTER SYSTEM FOR MANAGING I/O METRIC INFORMATION BY IDENTIFYING ONE OR MORE OUTLIERS AND COMPARING SET OF AGGREGATED I/O METRICS

BACKGROUND

Generally described, computing devices may utilize a communication network, or a series of communication networks, to exchange data. Companies and organizations may operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization.

To facilitate increased utilization of data center resources, individual computing devices within a data center may be configured to provide specific functionality according to the requirements of the data center. Moreover, virtualization technologies may allow a single physical computing device to host one or more instances of a virtual machine (e.g., a virtual machine instance), where the virtual machine device instance appears to a user of a data center as an independent computing device. With virtualization, the host computing device can create, maintain, delete, or otherwise manage virtual machine instances in a dynamic manner. In turn, users can request computing resources (e.g., storage resources) from the data center, including single computing devices or a configuration of networked computing devices, and be provided with virtual machine instances that provide the requested computing resources. Thus some hosted environments may include virtual machine instances that act as computing resources for computing devices (e.g., clients). These virtual machine instances may then use storage resources in the data center.

To access these storage resources, the virtual machine instances may send input/output (I/O) requests that allow them to read and write to the storage resources. Clients may send requests to the virtual machine instances over the communications network. The virtual machine instances may also, in turn, send requests to the storage resources. Satisfying a particular request may involve a number of read and write operations or related operations. A data center operator can evaluate the performance of these resources, and measure how quickly they satisfy I/O requests, by collecting I/O metrics during the read/write operations. However, the complex one-to-many relationship between I/O requests and read/write operations may prevent traditional statistical approaches from identifying I/O metric information that is relevant to performance improvement efforts.

BRIEF DESCRIPTION OF THE DRAWINGS

The foregoing aspects and many of the attendant advantages will become more readily appreciated and understood by reference to the following detailed description, when taken in conjunction with the accompanying drawings, wherein.

DETAILED DESCRIPTION

Figure 1:
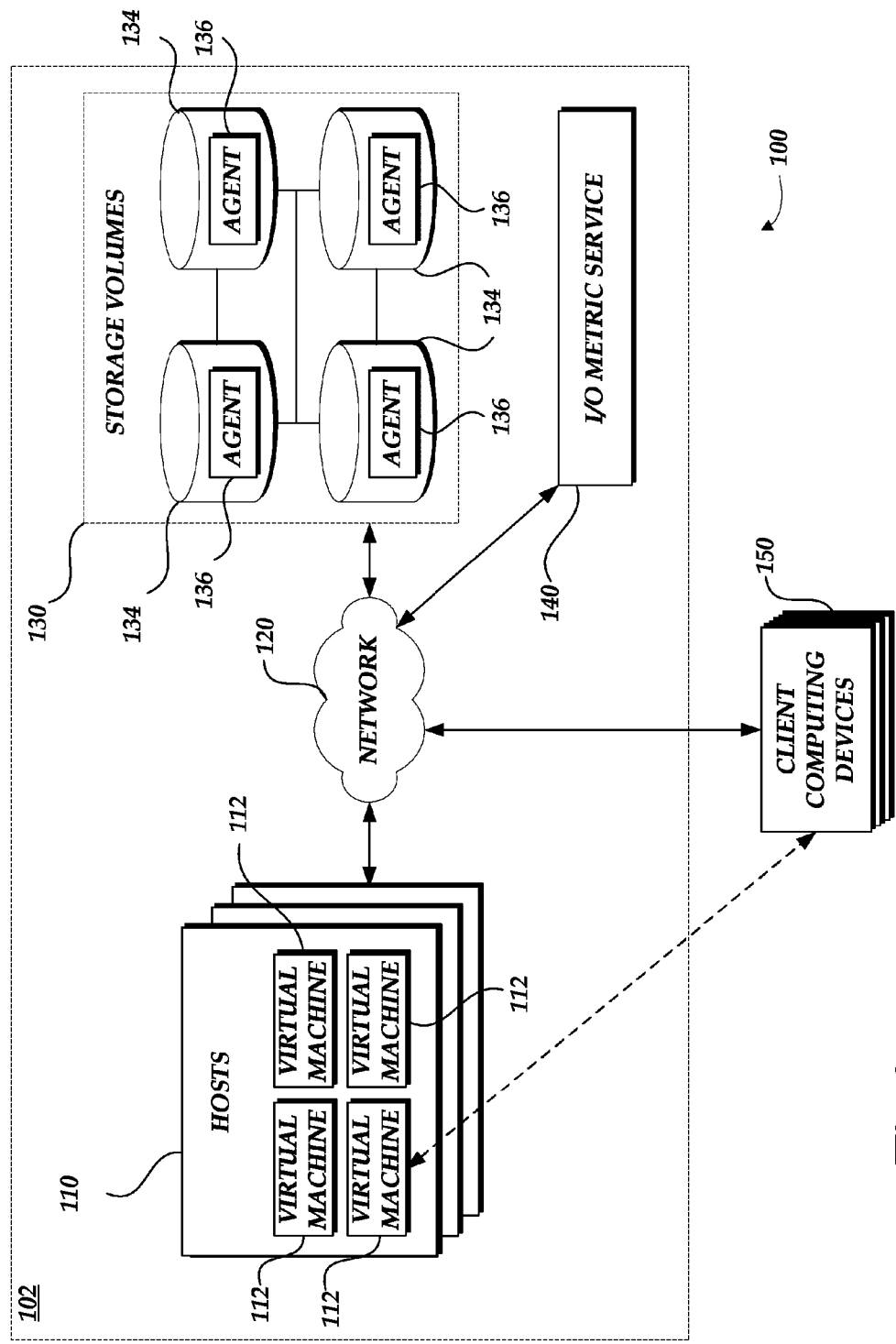
FIG. 1 is a schematic block diagram of an illustrative network topology including multiple virtual machines, storage volumes, and an I/O metric service interconnected via a network.

Generally described, aspects of the present disclosure are directed to processing I/O metric information collected by a data center operator. More specifically, aspects of the present disclosure correspond to systems, methods and computer-readable media related to dynamically detecting outliers in collected I/O performance metric information. Illustratively, network-based I/O requests are transmitted between a client computing device and one or more resources hosted on a data center, such as network-based storage volumes. In turn, data center operators hosting storage volumes can evaluate performance related to the transmission, processing and subsequent response by collecting and processing I/O metric information. Based on the collected and processed information, the data center operator can attempt to identify components or processes that create additional delay, components, or processes that may be experiencing errors or exceeding capacity, and the like.

In accordance with the present disclosure, a data center may collect, aggregate, and transmit I/O metric information to an I/O metric service. An I/O metric service may then receive, process, and publish I/O metric information. Illustratively, in some embodiments, the I/O metric service may collect I/O metric information from a data center. In still further embodiments, the I/O metric service or the data center may collect I/O metric information from client computing devices. I/O metric information may include a variety of metrics related to the processing of I/O requests from network resources. Illustratively, the I/O requests can correspond to network storage I/O request including, but not limited to, read/write operations, aggregated metrics for a number of read/write operations, information relating operations to each other, and network paths taken by I/O requests and operations. Once collected, only a small subset of the collected I/O metric information may be relevant to improving data center performance. For example, the data center may fulfill numerous I/O requests whose performance is unremarkable or not readily subject to improvement. Accordingly, in various embodiments of the present disclosure, the data center may detect outliers among the I/O metrics.

I/O metric information may further include primary identifiers and secondary identifiers. For example, a primary identifier may correspond to an I/O request, and secondary identifiers may correspond to the I/O operations that are performed in order to fulfill the I/O request. In some embodiments, primary identifiers are traces and secondary identifiers are spans. Further, in some embodiments, I/O metric information may include tertiary or higher-ordinal identifiers that correspond to sub-operations of a span. In some embodiments, self-describing formats of traces, spans, and subspans may contain relationship information, and may indicate that these I/O operations are related to one another. For example, a span may indicate that a related span is to be performed in parallel (e.g., reads to two storage volumes) or in series (e.g., a write and a subsequent write).

In some approaches, a data center may process aggregated I/O metric information to facilitate analysis of the I/O metric information. Illustratively, a storage volume agent within the data center may identify as outliers those aggregated I/O metrics exceeding a predefined threshold. For example, the storage volume agent may receive I/O metric information regarding six I/O requests, whose aggregate service time metrics indicate that the requests were fulfilled in 6.8, 10.2, 19.1, 7.4, 12.9, and 9.9 milliseconds respectively. The agent may compare these numbers to a threshold value, for example 15 milliseconds, and determine that the third of the six transactions is an outlier.

In other approaches, the agent may define a number of "buckets" (i.e., ranges) into which an I/O metric may fall, and identify as outliers those I/O metrics that fall within a particular bucket. For example, the agent may define a first bucket from zero to five milliseconds, a second bucket from five to ten milliseconds, a third bucket from ten to 15 milliseconds, and a fourth bucket above 15 milliseconds. The agent may then assess the six I/O metrics of the previous example and determine that no I/O requests fell within the first bucket, three I/O requests (6.8, 7.4, and 9.9 ms) fell within the second bucket, two I/O requests (10.2 and 12.9 ms) fell within the third bucket, and one I/O request (19.1 ms) was in the fourth bucket. The agent may then determine that the I/O request in the fourth bucket is an outlier. Alternatively, in some embodiments, the agent may determine that the I/O requests in the third bucket, fulfilled in 10.2 and 10.9 milliseconds, are outliers. Illustratively, in a data center that processes a high volume of I/O requests, determining that the second- or third-highest bucket contains outliers may identify outliers that are systemic in nature, as opposed to identifying I/O requests that were delayed for reasons that may not recur. These systemic outliers may therefore be better candidates for investigation when searching for performance improvement opportunities.

The storage volume agent may further determine the quantity of buckets and their bounds dynamically, based at least in part on previously collected I/O metrics. For example, the agent may determine that, of the six most recently analyzed I/O metrics, two fell into a range between six and eight milliseconds, two fell into a range between nine and eleven milliseconds, one fell into a range between eleven and 15 milliseconds, and one exceeded 15 milliseconds. The agent may therefore redefine its buckets accordingly, and may determine that I/O metrics in the 11-to-15 millisecond bucket are outliers. In some embodiments, the agent may combine threshold detection with buckets, using a combination of ranges and thresholds to identify outliers. Further, the agent may transmit relevant I/O metric information to an I/O metric service.

Though described herein with respect to I/O requests for data center storage devices, embodiments of the present disclosure may be applied to any networked service, including but not limited to requests for database resources, application services, virtual servers, web applications, content delivery, computing resources, data analysis, or other cloud computing services. Moreover, though illustrative examples are provided herein with regard to time-based I/O metrics, aspects of the present disclosure may be applied to any number and any combination of I/O metrics, and should not be construed to be limited to time-based metrics. For example, an agent may determine an outlier when an I/O request exceeds a certain quantity of data written to a particular type of storage volume. Further, although in a preferred embodiment an agent within the data center collects I/O metrics, aggregates them, and detects outliers, the present disclosure is not limited to an agent within the data center. For example, in some embodiments, an I/O metric service may collect I/O metrics from the data center, aggregate them, and detect outliers.

The foregoing aspects and many of the attendant advantages will become more readily appreciated as the same become better understood by reference to the following description of illustrative embodiments, when taken in conjunction with the accompanying drawings depicting the illustrative embodiments.

FIG. 1 is a block diagram depicting an illustrative network topology 100 including multiple hosts 110 with multiple sets of client computing devices 150 that communicate with the virtual machines 112 via network 120. Illustratively, the client computing devices 150 communicate via network 120 to virtual machines 112. Client computing devices 150 use virtual machines 112 to access storage volumes 134 via network 120. Accordingly, storage volumes 134 are provisioned for attachment to virtual machines 112 as storage resources for client computing devices 150.

Client computing devices 150 may generally include any computing device receiving the storage services provisioned through virtual machines 112 to the storage volume network 130. While the term "client" is used in reference to client computing devices 150, client computing devices 150 should not be construed as limited to end user computing devices. Rather, client computing devices 150 may include end user devices, devices owned or operated by other service providers, or devices owned or operated by an administrator of hosts 110 (e.g., a data center operator). Examples of client computing devices 150 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The network topology 100 further includes a network 120 operable to enable communication between the hosts 110, storage volume network 130 with storage volumes 134, client computing devices 150, and the I/O metric service 140. The network 120 may be, for instance, a wide area network (WAN), a local area network (LAN), or a global communications network.

The illustrated network topology 100 further includes a number of storage volumes 134 in a storage volume network 130. Generally, a storage volume 134 may correspond to a hard disk drive, network accessible storage, or any other type of perpetual or substantially perpetual storage accessible by one or more of the client computing devices 150. For example, the storage volumes 134 of FIG. 1 may correspond to network accessible storage devices. Though depicted as external to client computing devices 150, in some embodiments, storage volumes 134 may be internal to a specific client computing device 150.

When virtual machines 112 access storage for certain objects or files (e.g., data stores, file stores, or object stores), statistics at the client computing devices 150 can be collected regarding I/O requests that the virtual machines 112 send to storage volume network 130 via the network 120. However, a protocol that provides for such statistics may make the operation of the data center network 120 perform slowly or degrade, as it services the I/O metric requests of the client computing devices 150. Instead, the I/O metric service 140 may publish statistics regarding the storage volume network 130 that the agents 136 initially collect and aggregate as I/O metric information. This approach may thereby avoid some of the disadvantages of using a protocol to communicate I/O metrics or statistics to the client computing devices 150 over network 120.

The storage volumes 134 of the storage volume network 130 contain the agents 136 that are configured to collect I/O metrics regarding I/O requests, process the I/O requests, and subsequently aggregate the I/O metrics. More specifically, the agents 136 collect and aggregate I/O metrics regarding I/O requests from the virtual machines 112 accessing storage volumes 134. The storage volume network 130 may then provide these I/O metrics, in some embodiments stored in a ring buffer, to the I/O metric service 140 for further statistics processing. One skilled in the relevant art will appreciate that a ring buffer is a structural allocation of data storage that functions to provide first in, first out (FIFO) reading and writing to the ring buffer, thereby buffering a data stream. In some embodiments, this structural allocation can be logical or physical within a storage volume and can use pointers to index the FIFO characteristic of the ring buffer. In one embodiment, a host 110 may include a single computing device (e.g., a server). Similarly, the storage volume network 130 may include a single computing device (e.g., a storage server). In another embodiment, a host 110 may include multiple computing devices in communication with one another, collectively providing a service to the client computing devices 150. And again similarly, the storage volume network 130 contains several storage volumes 134 existing as physical devices and communicating over a network to each other. A hosted computing environment of the host 110 may also be referred to as a cloud computing environment. Further, in other embodiments that are not illustratively depicted in FIG. 1, the agents 136 may reside on one of the hosts 110, across several hosts of hosts 110, or even independently operating hosts within the data center network 102. In some embodiments, the agents 136 may reside, instead, on the I/O metric service 140. As one skilled in the art may recognize, the agents 136 can be configured to operate on any network entity associated with network 120. For example, agents 136 may be configured to operate on a single computing device (e.g., a storage server) or several multiple computing devices in communication with one another.

Illustratively, the agents 136 collect and aggregate I/O metrics of I/O requests sent to storage volume network 130 by virtual machines 112. Because agents 136 aggregate statistics where the I/O requests are being processed, real time I/O metrics may be provided locally to an operator of storage volume network 130, or more generally, an operator of data center network 102. Further, these I/O metrics are more detailed than any aggregated I/O metrics provided over the network 120 to client computing devices 150, which may not have a protocol that provides for detailed I/O metrics of the I/O operations processed at the storage volumes 134. Accordingly, a local "dump" of detailed I/O metrics can be provided to an operator evaluating the performance of the storage volume network 130. Further still, these detailed I/O metrics can be used to detect outliers. For example, the I/O metric service 140 may identify as outliers any I/O requests that are taking more than a predetermined duration to complete.

Still referring to FIG. 1, the storage volume network 130 stores these I/O metrics in a ring buffer within the storage volume network 130 using primary and secondary identifiers to identify these I/O metrics and further aggregate them. In some embodiments, these primary and secondary identifiers may be referred to as traces and spans respectively. These primary and secondary identifiers may associate the relationship among I/O operations performed for an I/O request—or even the relationship among several I/O operations for a set of I/O requests. In other embodiments, tertiary identifiers, which may be referred to as subspans, may further collect and aggregate I/O metrics of storage volume network 130, with these tertiary identifiers further associating a dependent relationship among the I/O operations.

In various other embodiments of the illustrative network topology 100, the agents 136 are configured to provide I/O metrics collected and aggregated from various entity perspectives. Upstream and downstream dependencies may be captured (e.g., collected and aggregated by agent 136) with the primary and secondary identifiers associating I/O requests with certain relationship information. This may occur, for example, even viewed from the perspective of a client computing device 150. In one embodiment, spans are associated with the receiving end of the I/O request, that is, a client computing device 150 has spans associated with the response from its initial I/O request. With this approach, an agent at client computing device 150 collects and aggregates I/O metrics to be forwarded to I/O metric service 140. With both I/O metrics from the storage volumes 134 and the client computing device 150, I/O metric service 140 processes statistics to intertwine the I/O metrics from both entities and understand the relationship of the I/O request with the I/O request's resulting downstream behavior at the storage volumes 134. Spans also can be associated with a hosted environment, or as to the host 110 and individual virtual machine instances 112. From this perspective agents can use spans to collect and aggregate I/O metrics from all associated entities of the data center network 102, including the storage volumes 134, the client computing devices 150, and any virtual machine instances 112 providing storage resources for a client computing device 150.

Still further, in some embodiments, traces and spans can be associated with the performance of network 120 so that the I/O request behavior within network 120 also is tracked. I/O metrics from all entities and the interdependent relationships indicated by the primary, secondary, and tertiary identifiers may be processed further in the I/O metric service 140 for further analysis and evaluation of the entire performance of the storage volumes 134 and I/O requests generally within the network topology 100. This approach may allow statistics to be determined for networks with high-volume transaction rates (e.g., I/O requests) so that more detailed and real time data may be processed at the I/O metric service 140, without the overhead of existing statistics collection at a client computing device 150.

The illustrated network topology 100 further includes the I/O metric service 140 within the data center network 102. The I/O metric service 140 communicates with the individual storage volumes 134 or the storage volume network 130. Generally, the I/O metric service 140 can correspond to a hard disk drive, network accessible storage, or any other type of perpetual or substantially perpetual storage accessible by one or more of the client computing devices 150. For example, the I/O metric service 140 of FIG. 1, in some embodiments, corresponds to a network accessible storage server. In some embodiments, the I/O metric service is viewed as a centralized statistics service specifically for the storage volume network 130. Accordingly, in some embodiments, the I/O metric service 140 can be referred to as a centralized I/O metric service. In such embodiments that are not illustratively depicted, the I/O metric service 140 can be configured to operate on any network entity associated with network 120. For example, the I/O metric service 140 can be configured to operate on a single computing device (e.g., a storage server) or several multiple computing devices in communication with one another.

In various embodiments, the I/O metric service 140 obtains from the ring buffer within the storage volume network 130 the aggregated I/O metric information via network 120. After receiving the aggregated I/O metric information, the I/O metric service 140 further processes the I/O metrics into statistics, for example, determining a performance threshold. With these threshold statistics, the I/O metric service 140 determines and/or detects outliers among certain I/O operations are performing slowly; for example, the path taken by an I/O request is congested, or a certain I/O operation is taking more time than other similar I/O operations. The I/O metric service 140 publishes this processed, aggregated I/O metric information (e.g., overall statistics). In various embodiments, the I/O metric service 140 may be viewed as making accessible this processed, aggregated I/O metric information to any network entity within the network 120. For example, client computing device 150 or the virtual machine instance 112 requests the overall statistics of a certain storage volume 134 or even the performance of storage volume network 130 at a certain time of day. Components and attributes of the I/O metric service 140 are further described below with respect to FIG. 2.

In various embodiments of the illustrative network topology 100, the I/O metric service 140 of FIG. 1 is configured to provide processed, aggregated I/O metrics that are sent in as a frequency distribution to the I/O metric service 140 for overall aggregate statistics of a storage volume network 130 or even the data center network 102. The agents 136 provide detailed statistics that are also available via the primary and secondary identifiers using the ring buffer to provide real-time, close to real-time, continuous, or current detailed I/O metrics of the specifics of certain I/O operations of an I/O request. Further, such detailed I/O metrics also provide the operator with the relationship among the I/O metrics, for example, the timer of a certain I/O operation indicates that it is causing delays to I/O operations performed in parallel or series. As one skilled in the art will recognize, I/O operations occurring in series correspond to I/O requests that are received in series at a storage volume 134, for example, a first I/O request is received, and subsequently a second I/O request is received.

Such detailed I/O metrics also indicate that a certain I/O path is congested because the subspan tracking the I/O response timer is often delayed. Such a system may allow a data center operator to evaluate the performance of I/O operations or I/O requests generally at various storage volumes 134, without necessitating the use of a cumbersome, overloaded protocol to communicate such statistics to client computing devices 150 or degrading the performance of network 120 if numerous I/O requests are sent to storage volume network 130. In one embodiment, an outlier is identified (e.g., because it falls below a performance threshold) as a slow performing arc, indicating to an operator of a data center that a change may be need to improve performance of the systems, or I/O requests generally.

Figure 2A:
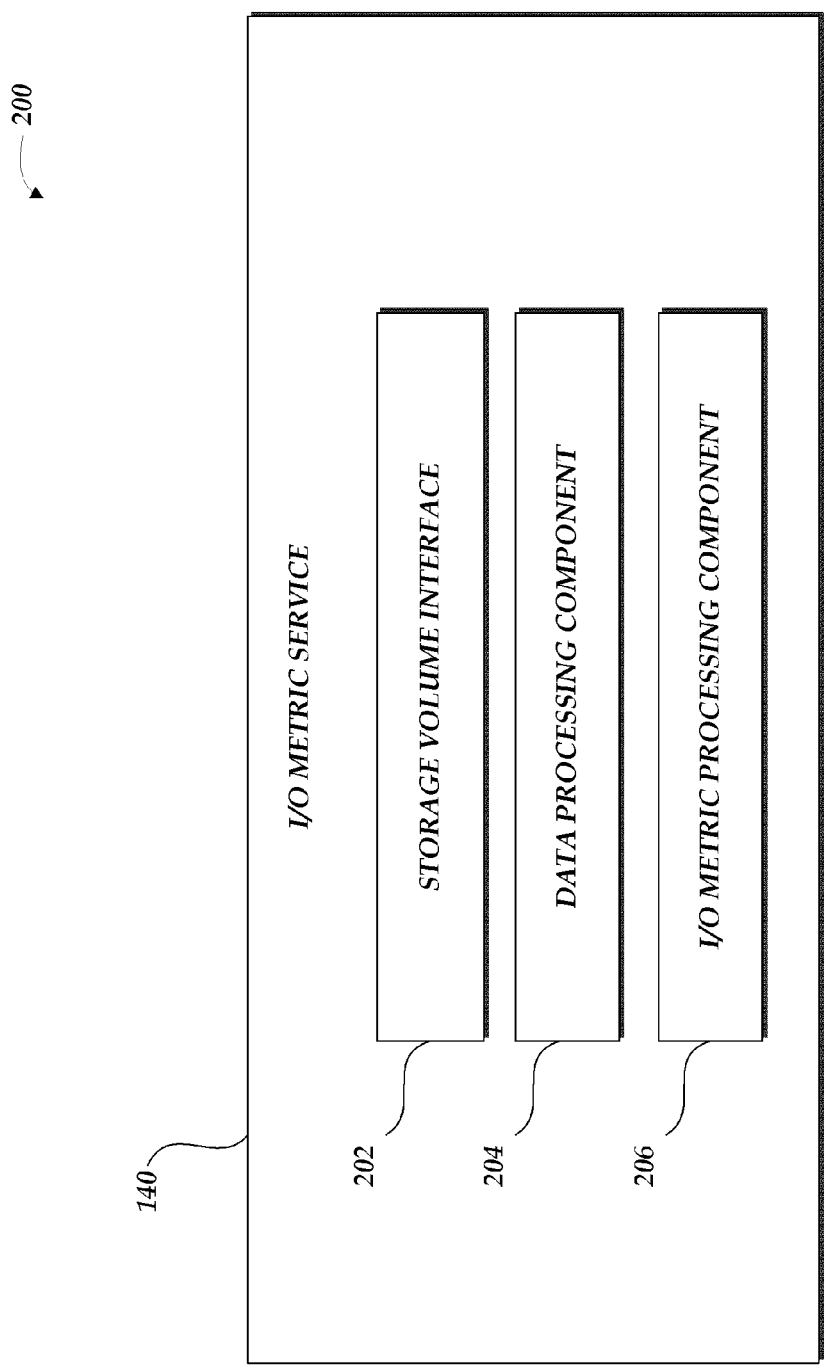
FIGS. 2A and 2B are illustrative block diagrams depicting components of an I/O metric outlier detection service included within the network topology of FIG. 1.

FIG. 2A is a block diagram depicting illustrative components of an I/O metric service 140 included within the network topology of FIG. 1. The I/O metric service 140 includes a storage volume interface 202 for receiving aggregated I/O metric information to be processed from the ring buffer. The I/O metric service 140 further includes the data processing component 204, which processes the aggregated I/O metric information into overall statistics. The I/O metric service 140 also includes an I/O metric processing component 206, which publishes the processed, aggregated I/O metric information (e.g., as overall statistics). In one embodiment, a data center operator of a data center network 102 can access these published statistics via the network 120.

Illustratively, the data processing component 204 and the I/O metric processing component 206 may include a number of hardware and software components. More specifically, the data processing component 204 and the I/O metric processing component 206 may include hardware, software, configuration data, data structures, computer-readable code, or any type of information that can be loaded into memory and processed or published by the data processing component 204 and the I/O metric processing component 206 respectively. Aspects of the data processing component 204 and the I/O metric processing component 206 will be described in further detail below with respect to FIG. 3B that illustrates the transmission of an I/O request and I/O metric aggregation. In various embodiments, reference to the I/O metric service 140 within the present disclosure may include multiple computing devices working in conjunction to facilitate the processing of aggregated I/O metric information and publishing of overall statistics. For example, in various embodiments, the I/O metric service 140 may be distributed through a network or implemented by one or more virtual machine instances.

The storage volume interface 202 may refer to a physical communication interface on a physical computing device. The storage volume interface 202 may be an electrical communication interface, an optical communication interface or other type of interconnect interface known in the art. The storage volume interface 202 may be configured to provide communications between units within the I/O metric service 140 (e.g., the I/O metric processing component 206) and the virtual machine instances 112 hosted on hosts 110. Illustratively, the configuration of the storage volume interface 202 may be optimized based on specific criteria, such as low latency, high speed, and high bandwidth, among others. In some embodiments, the interconnect interface may correspond to a high speed serial computer expansion bus, such as a Peripheral Component Interconnect Express (PCIe) bus. One skilled in the relevant art will appreciate that the storage volume interface 202 may incorporate alternative or additional standard interconnect interfaces well known to those skilled in the art. In some embodiments, the storage volume interface 202 includes a ring buffer or queue where aggregated I/O metrics sent from the storage volume network 130 may wait to be processed and published by the I/O metric service 140. In one embodiment, this aggregated I/O metric information is received via the storage volume interface 202 as a percentile distribution based at least in part on other similar I/O operations that have occurred on the same storage volume.

Figure 2B:
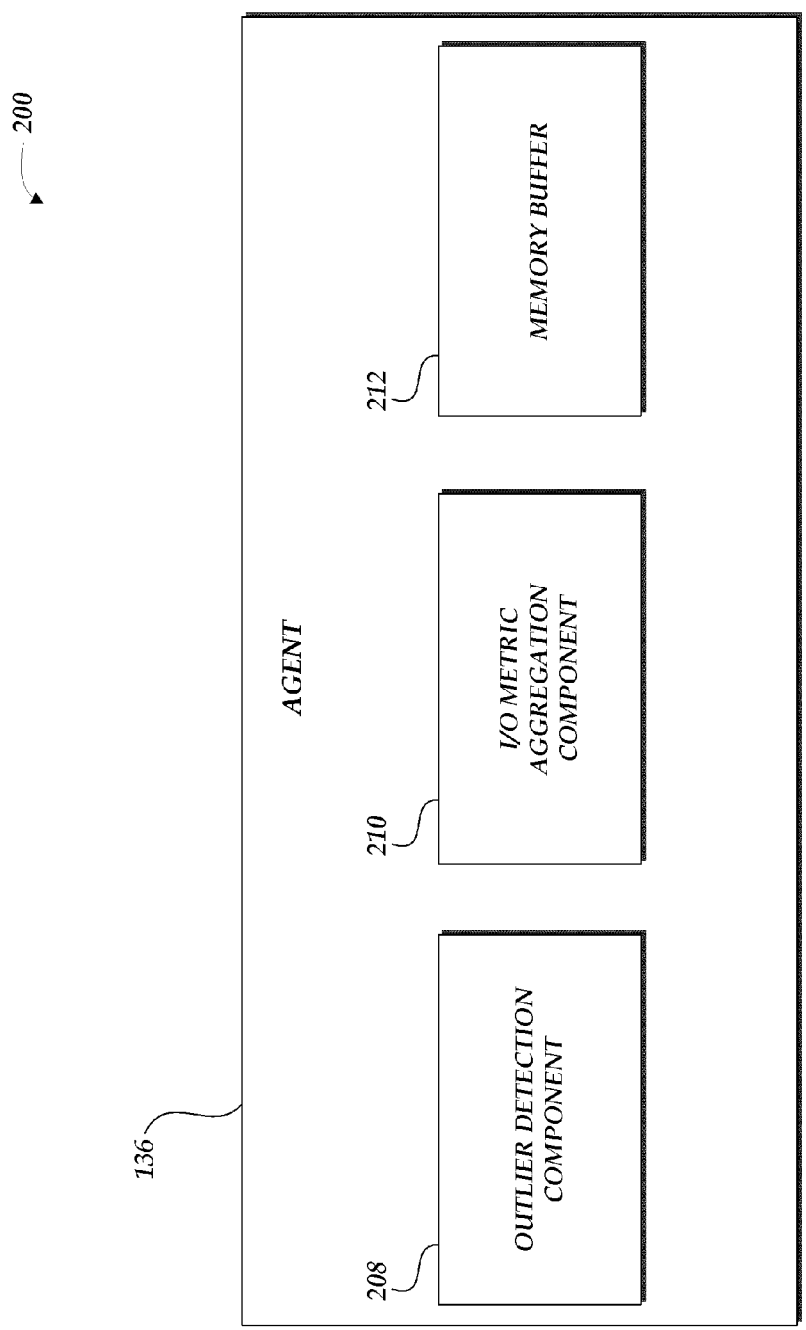

FIG. 2B is a block diagram depicting illustrative components of a storage volume agent 136 included within the network topology of FIG. 1. The agent 136 may include an outlier detection component 208 configured to collect I/O metrics corresponding to traces and spans as the storage volume network 130 receives and fulfills I/O requests. The outlier detection component 208 may be further configured to determine and identify outliers among the collected I/O metrics. As described in more detail above and with reference to FIG. 4A below, the outlier detection component 210 may utilize thresholds, predetermined "buckets," or dynamically determined buckets to detect and identify outlier I/O metrics. The agent 136 may further include an I/O metric aggregation component 210, which aggregates and generates summary statistics for the I/O metrics collected by the outlier detection component 208. The generation of summary statistics by the I/O metric aggregation component 210 is described in more detail below with regard to FIG. 4A.

In the illustrated embodiment, the agent 136 may include a memory buffer 212, which buffers the I/O metric information generated by the outlier detection component 208 and the I/O metric aggregation component 210. Illustratively, the memory buffer 212 may include a number of hardware and software components. More specifically, the memory buffer 212 may include hardware, software, configuration data, data structures, computer-readable code, or any type of information that can be loaded into memory and processed or published by the data processing component 204 and the I/O metric processing component 206 of FIG. 2A. In several embodiments, the memory buffer 212 may be a ring buffer, and may be allocated statically or dynamically to determine the amount of I/O metric information to be collected.

Figure 3A:
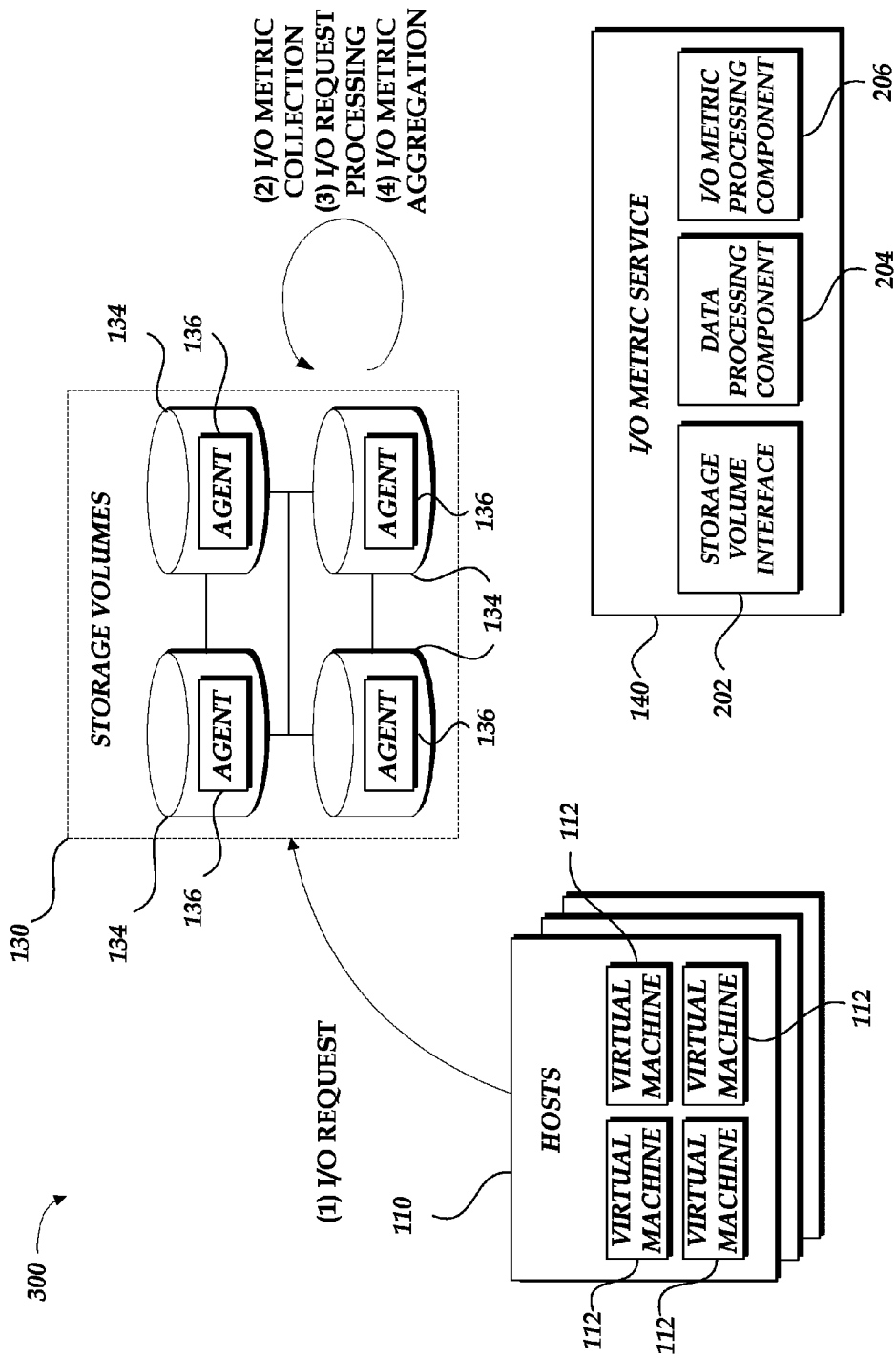
FIGS. 3A and 3B are block diagrams of the network topology of FIG. 1 illustrating transmission of an I/O request, I/O metric aggregation, an I/O metric transmission event, and processing of I/O metric information.

FIG. 3A is a block diagram of the network topology of FIG. 1 illustrating transmission of an I/O request and I/O metric aggregation. At (1), a hosted virtual machine instance 112 transmits an I/O request to the storage volume network 130. An I/O request may be any request for a storage volume 134 that uses the storage resource in some way. For example, in one embodiment, the I/O request corresponds to a data backup I/O request, with a trace mapped to that I/O request; and I/O operations of that I/O request correspond to a read to a master storage volume and write to a slave storage volume, with spans mapped to those I/O operations. Using the same example, a subspan may be assigned to the latter span, which tracks a timer that measures the time to write to the slave storage volume. Another subspan may track another timer that measures the time to subsequently read to that same storage volume (e.g., perhaps to ensure that the write occurred and thus that the data backup actually occurred). Further, the I/O request includes relationship information. In the continued example from above, the write may have had to be performed prior to the read (because otherwise an operation checking that a write operation had occurred would be useless).

At (2), after an I/O request is received at storage volume network 130 (e.g., more specifically at a storage volume 134), the agents 136 begin I/O metric collection. The agents 136 store traces and spans in a buffer (e.g., a ring buffer). In some embodiments with large data processing, traces and spans are determined ahead of time, that is, the amount of data to be collected is preallocated in the buffer. For example, traces and spans are stored into a ring buffer. The size of the ring buffer determines the amount of data to be collected. The size of the ring buffers may be fixed or may be dynamic (e.g., with dynamic memory allocation). For example, in one embodiment, dynamic memory allocation may be used when a large amount of requests are not being transmitted via the network 120. In various other embodiments, static allocation may provide for a fixed size of the ring buffer, thereby allowing real time collection of I/O metric information for numerous I/O requests.

In this approach of I/O requests processing, when a new I/O request is received at the storage volume 134, the ring buffer is searched for empty traces. Thus the ring buffer allows traces and spans to be reused for incoming I/O requests. One of the disadvantages avoided with this approach is that new traces and spans need not be created for each new I/O request. Instead, the same traces and spans can be reused for data aggregation. As described further with respect to aggregation, after aggregation, traces and associated spans and/or subspans are placed back into the ring buffer for the next I/O request.

During this I/O metric collection process, I/O requests are also associated with identifiers. That is, aspects of the present disclosure provide that traces, spans, and subspans represent the relationship between timers associated with spans or subspans, for example, timers that track I/O operations in parallel or in series. In some embodiments, this can be I/O requests that indicate: replicating is to occur at another storage volume 134, loading data from the storage volume 134 is to occur, or even locking the storage volume 134 is to occur. For example, in many cases, replication occurs in parallel with a master storage volume 134 replicated at the slave storage volume 134 and, at the same, writing to the disk at the master storage volume 134. This relationship information can be encapsulated within a timer tracked by a span or several subspans. This allows I/O metrics of the timers to be tracked, for example, writing to disk at the master storage volume 134 may take longer than expected and thus have secondary effects on other timers of various storage volumes 134. In some embodiments, spans include start and end times for timers. In all, the spans and the subspans limited by the size of the ring buffer can be used to capture detailed I/O metric information associated with the spans and thereby used to evaluate the performance of the storage volumes 134 in real-time, close to real-time, or continuously so as to provide up to date information.

At (3), during the I/O metric collection, the I/O requests are processed by the agents 136. As part of this I/O processing, the agents 136 associate primary, secondary, and tertiary identifiers with the I/O requests; in some embodiments, these identifiers are referred to as traces, spans, and subspans. In various embodiments, a trace may contain metadata that informs the storage volume 134 of the various timers associated with the I/O request. Then, the trace is associated with any I/O operation that is related or associated to that particular I/O request. Further, any activity or I/O operation then associates with its own span—in essence a one-to-one mapping, although such a one-to-one mapping is not required. For example, a trace may represent a single I/O request, which may include a replication relationship. As an exemplary replication relationship, an I/O operation of the I/O request may be a read to the slave storage volume 134 and, in parallel, a write may be done to the master storage volume 134.

To further associate the I/O requests then, a trace is considered as a series of spans, where each span measures a particular I/O operation or component of the I/O request. In the same continued example, two spans represent the relationship of this master/slave replication: one span may include a timer that tracks the read the slave storage volume 134, while another span includes a timer that tracks the write to the master storage volume 134. Thus the agent 136 processes an I/O request (e.g., the write to the master storage volume) while traces and spans associated with the I/O request track the I/O requests and I/O operations respectively, and the various relationships among both the I/O requests and I/O operations. In some embodiments, this tracking of I/O requests corresponds to the I/O metric collection process.

Further regarding the I/O request processing, the agents 136 also associate subspans, for example, if a span is sending a message to the slave storage volume, then two subspans could also be associated with that message: one subspan may be processing at the slave storage volume and another subspan may be receiving a response from the slave storage volume at the master storage volume. In various embodiments, the agents 136 may associate I/O requests with spans and subspans. As another example, a write I/O request may have two spans tracking the write: a local write to a storage volume 134 and a remote write to another storage volume 134. With such detailed associations, once collected and aggregated, individual performance I/O metrics from the spans and subspans may be evaluated locally, for example, by an operator of storage volume network 130. Thus, an operator of the storage volume network 130 may obtain, based on the aggregated, individual performance I/O metrics, estimates of percentiles using histograms, binary heaps, or other approaches commonly understood by those skilled in the art. In some embodiments, such summary statistics are calculated and generated by the agents 136 as part of the generating the individual performance I/O metrics.

In some embodiments, the agents 136 associate spans and subspans with a particular I/O request that the agents 136 define based, in part, on that I/O request. Traces, spans, and subspans may use a self describing format, which allows identification by other function calls or arguments based on that format. More specifically, the self describing nature of a particular span (e.g., a global span) is that the span has a context associated with it. For example, other function calls and error arguments request the specific data associated with that global span, without necessitating a function call and error arguments to each subspan, each trace, or even each span. This may avoid some of the disadvantages of using a span with a single identification, namely, that numerous single identifications may be created for numerous I/O requests, overwhelming the I/O system. Further, with this approach, spans can be called by other processes and functions that are aware of the specific data that span has associated with it, for example, the time to write at a slave storage volume 134. Thus this approach allows the agents 136 or an operator of the storage volume network 130 to call/access only the spans or subspans with information that the agent 136 or the operator may be seeking. In contrast to a single identification system, the agent 136 or the operator may have to call several spans before it discovers the information that it is seeking. In various embodiments, a global identifier tracks all the associated traces, spans, and subspans associated by the agent 136. As discussed in more detail with reference to FIG. 4A below, the agents 136 may then detect outliers among the collected and processed I/O metrics.

After I/O metric processing, at (4), the agents 136 aggregate the I/O metric information collected by the spans and subspans (e.g., the various timers that spans and subspans use). In various embodiments, the agents 136 first perform aggregation across subspans, then spans, and, finally, traces. In other embodiments, the agent 136 of a master storage volume 134 aggregates all of the I/O metrics at the volume itself, along with the I/O metrics provided to it by a slave storage volume 134. In this embodiment, the master storage volume may immediately transmit I/O metric information to the I/O metric service 140. Similarly, a virtual machine instance may independently use the agent 136 to aggregate this I/O metric information and then transmit that aggregated I/O metric information to the I/O metric service 140. In various embodiments, the agents 136 aggregate I/O metrics more frequently (e.g., at one minute boundaries), for example, frequent aggregation occurs with numerous I/O requests to the storage volume network 130. Finally, the agents 136 then provide aggregated I/O metric information (e.g., a percentile distribution/construct) from the ring buffer and send for further processing at the centralized I/O metric processing service. In some embodiments, detailed I/O metric information can be provided with the percentile distribution, for example, the time of an I/O metric transmission event can be associated with a specific write to the slave storage volume 134. Further, in some embodiments, agents 136 may generate additional summary statistics, which may be used by an operator of a data center network 102 to identify outliers.

The illustrated transmission of an I/O request and I/O metric aggregation depicted in FIG. 3A can be used to collect and aggregate detailed I/O metric information, in part, by limiting the size of the ring buffer and increasing the frequency of aggregation for numerous I/O requests. In some embodiments, this approach may not overwhelm the network with the collection and aggregation of data. Because the ring buffer preallocates the traces and spans that collect data according to their dependent relationships, the network 120 may not be overwhelmed with the individual statistics collection that may exist in a client-centric statistical collection process. Further, this approach allows the agents 136 to collect and aggregate I/O metric information when most needed. That is, because I/O transmission events that are troublesome often degrade the performance of the network 120, I/O metric collection and aggregation may continue without further hindering that already degraded network. Further still, because the ring buffer limits the amount of data to be collected, data collection and aggregation may occur without degrading the network 120.

Figure 3B:
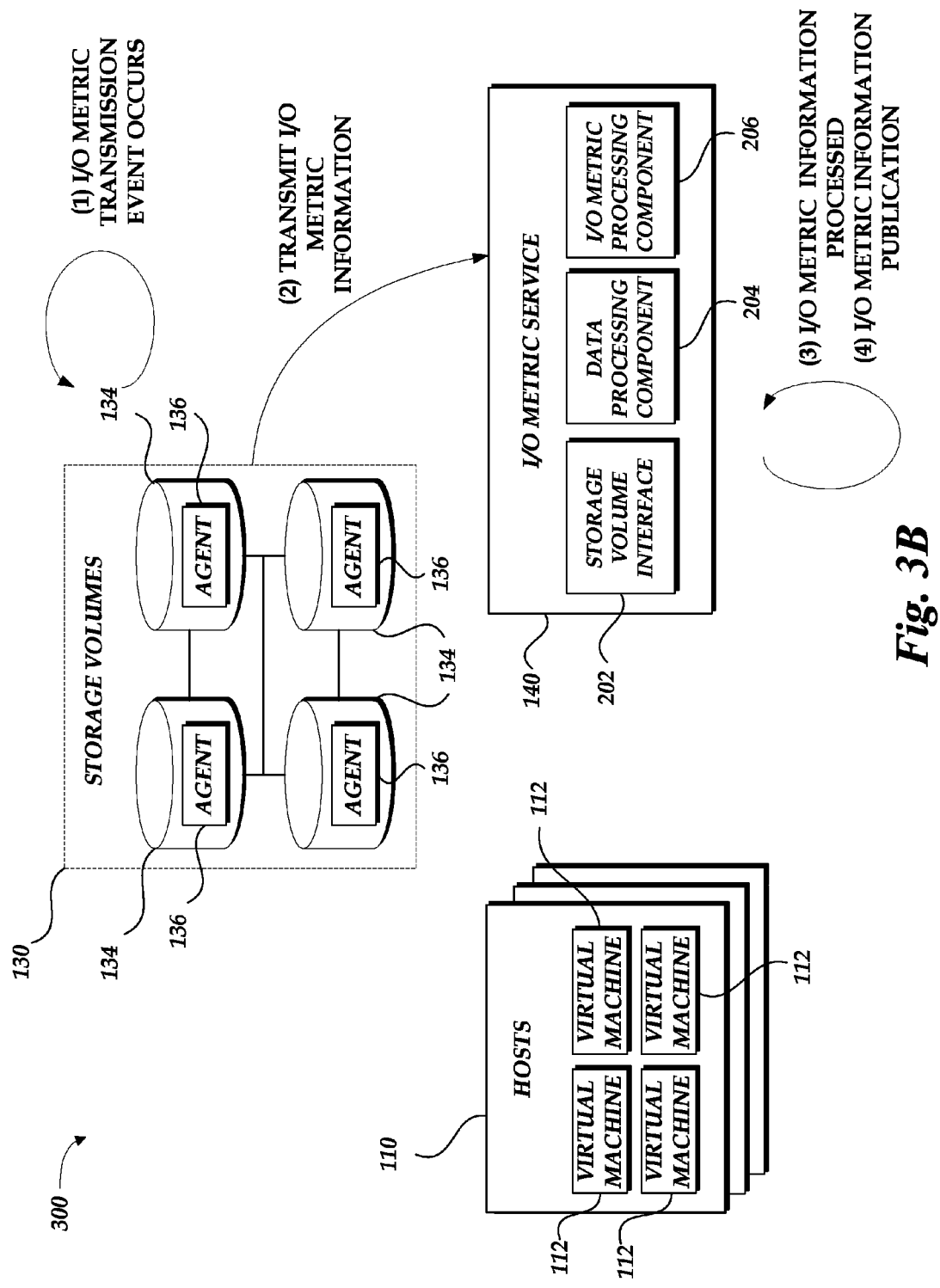

FIG. 3B is a block diagram of the network topology of FIG. 1 illustrating an I/O metric transmission event, processing of I/O metric information, and publishing I/O metric information as overall statistics. At (1), an I/O metric transmission event occurs at the storage volume network 130. For example, the agents 136 detect that I/O miss/failure has occurred, for example, a write I/O operation to the storage volume 134 has failed. When such events occur that cause performance degradation within the storage volume network 130, the agents 136 use spans and subspans to collect and aggregate detailed (e.g., fine granularity) I/O metric information. After collected and aggregated, these aggregated I/O metrics are stored in another ring buffer (e.g., a queue) awaiting transfer to the I/O metric service 140.

At (2), the storage volume network 130 transmits the aggregated I/O metric information to the I/O metric service 140. In various embodiments, one agent 136 may transmit such I/O metric information or several agents 136 may. In one embodiment, these aggregated I/O metrics are stored as percentile distributions (e.g., P95) in a queue within storage volume network 130, waiting for further processing at the I/O metric service 140. In one embodiment, another ring buffer may exist at the I/O metric service 140 acting as a queue for incoming aggregated I/O metrics sent from a ring buffer used by the agents 136.

Next, at (3), the data processing component 204 processes the aggregated I/O metric information received via the storage volume interface 202. In some embodiments, the data processing component 204 processes the aggregated I/O metric information if I/O requests become numerous so that real time statistics are available to be published by the I/O metric processing component 206. In other embodiments as described above, the data processing component 204 processes the aggregated I/O metric information with respect to a certain entity perspective (i.e., from the perspective of a virtual machine instance 112). Or in other embodiments, the data processing component 204 may use the relationship information from the various identifiers used to collect and aggregate the data to provide statistics that relate various I/O operations with each other, various entities to each other, and/or a combination of these approaches.

Still referring to FIG. 3B, at (4), the I/O metric service 140 publishes the I/O metric information as statistics. Such statistics may be provided to various entities or operators. For example, the I/O metric processing component 206 publishes the statistics to a network or sends the statistics to a specific requesting entity (e.g., a client computing device 150 or a virtual machine instance 112). In other embodiments, a data center operator may access the I/O metric service 140 via the network 120 to request the published statistics from the I/O metric processing component 206. Or, in various other embodiments, the I/O metric processing component 206 may publish the statistics directly to the storage volume network 130 or a specific storage volume 134 that may have been accessed locally by an operator. For example, a certain path to a slave storage volume may be performing slowly for several virtual machine instances at a hosted environment stored at an edge server compared to the server that is hosting the storage volumes. Because the edge server is located at a farther distance or routed differently, that particular I/O path may be performing a write or a read slowly to the slave storage volume. Thus the I/O metric service 140 is configured to provide statistics that allow a data center operator to evaluate which I/O operations or entities are slower performing, based on a performance threshold or various other quantitative approaches known to those of skill in the art.

Figure 4A:
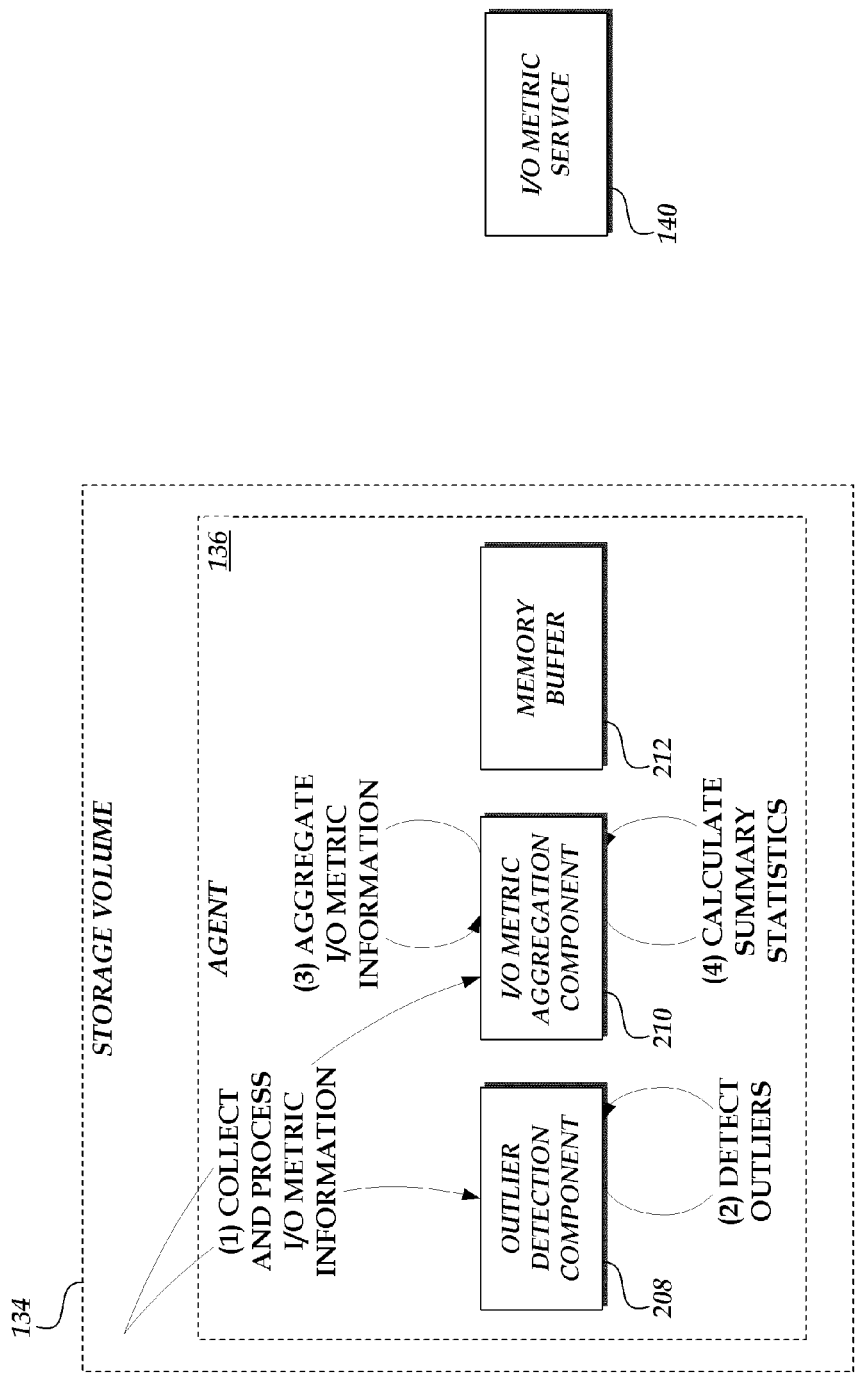
FIGS. 4A and 4B are illustrative block diagrams depicting dynamic detection of an outlier I/O metric, as performed by the storage volume agent and the I/O metric service of FIGS. 2A and 2B.
Figure 4B:
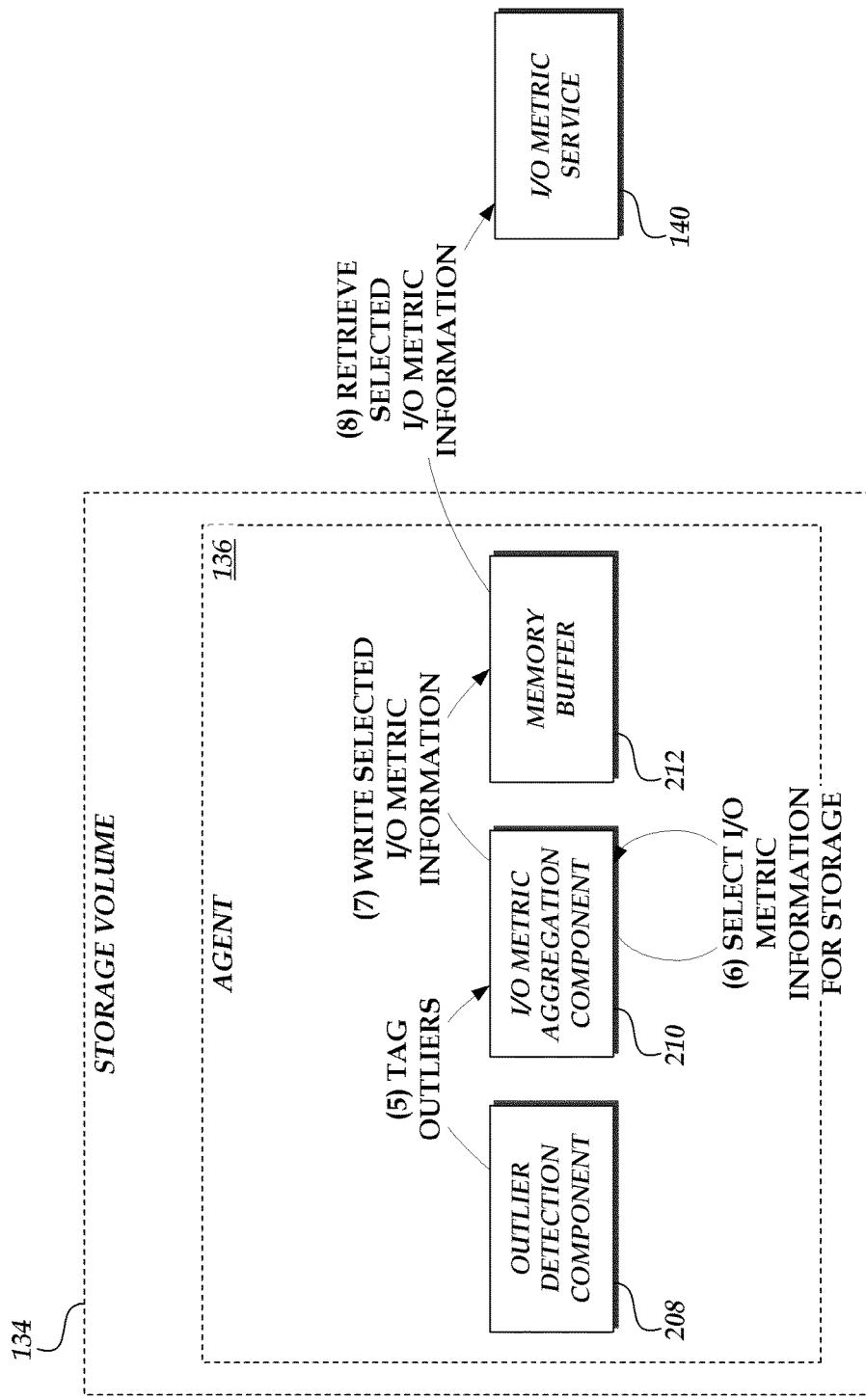

With reference now to FIGS. 4A and 4B, illustrative interactions for collecting and aggregating I/O metrics, determining outliers, and storing I/O metric information will be described. Specifically, FIG. 4A depicts an illustrative interaction for the collection of I/O metrics and determination of outliers by the outlier detection component 208, and for the aggregation of I/O metrics and calculation of summary statistics by the I/O metric aggregation component 210. FIG. 4B depicts an illustrative interaction for the selection of I/O metric information to be stored, the writing of the selected I/O metric information to a memory buffer 212, and the retrieval of the selected I/O metric information by an I/O metric service 140.

Referring to FIG. 4A, at (1), the outlier detection component 208 may collect and process I/O metric information from the storage volume network 130, and the I/O metric aggregation component 210 may aggregate I/O metric information from the storage volume network 130. In some embodiments, the outlier detection component 208 may capture I/O metric information at storage volumes 134 as I/O requests and I/O operations are completed. The I/O metric information for requests and operations may include primary and secondary identifiers, and in some embodiments these identifiers may be traces and spans respectively. Illustratively, the outlier detection component 204 may collect I/O metric information for each I/O operation, for a sample of I/O operations, or when specified conditions are met (such as a particular time of day or a particular type of I/O request). Collection and processing of I/O metric information is described in more detail with reference to FIG. 3A, above. Although FIG. 4A illustratively depicts the outlier detection component 208 and the I/O metric aggregation component 210 operating in parallel, one skilled in the art will recognize that these interactions may be carried out in any order.

The outlier detection component 208 may then, at (2), determine one or more outliers from the set of collected I/O metrics. As described in detail above, in some embodiments, the outlier detection component 208 may identify as outliers those I/O metrics exceeding a predefined threshold. In other embodiments, the outlier detection component 208 may define a number of ranges into which an I/O metric may fall, and identify as outliers those I/O metrics that fall within a particular range. The outlier detection component 208 may further determine the quantity and bounds of these ranges dynamically, based at least in part on previously collected I/O metrics, and may combine threshold and range detection of outliers.

At (3), the I/O metric aggregation component 210 may aggregate the received I/O metric information. Illustratively, in some embodiments, the I/O metric aggregation component 210 may generate I/O metrics for a trace by aggregating the I/O metrics of the relevant spans. For example, some of the spans associated with a read trace may be performed in parallel, while others may be performed sequentially. The I/O metric aggregation component 210 may determine the I/O metrics for a trace by identifying the critical path through the span operations and aggregating only these metrics. Alternatively, in some embodiments, the I/O metric aggregation component 210 may, for example, determine the time required to complete a trace by calculating the time between the start of the first span and the end of the last span. The I/O metric aggregation component 210 may further aggregate I/O metrics for spans independently of the traces that correspond to them. For example, the I/O metric aggregation component 210 may aggregate I/O metrics for spans that parse an I/O request, of which there may be one per trace. One skilled in the art will again appreciate that the illustrative interaction at (2) may be carried out before, in parallel with, or after the interaction at (3).

The I/O metric aggregation component 210 may then, at (4), calculate summary statistics for the aggregated I/O metrics. For example, the I/O metric aggregation component 210 may calculate the minimum, maximum, mean, variance, and the sample size for a particular set of I/O metrics. The I/O metric aggregation component 210 may further calculate additional statistics, such as the range and skewness of the sample set, based on the generated summary statistics. Still further, the I/O metric aggregation component 210 may generate percentiles for the I/O metrics. The I/O metric aggregation component 210 may generate percentiles by storing and sorting I/O metrics. In some embodiments, the I/O metric aggregation component 210 may generate estimates of percentiles using histograms, binary heaps, or other approaches commonly understood by those skilled in the art.

With reference now to FIG. 4B, an illustrative interaction for selecting and storing I/O metric information relevant to an outlier will be described. The outlier detection component 208 may, at (5), tag an I/O metric as an outlier, and thereby indicate to the I/O metric aggregation component 210 an interest in storing I/O metric information corresponding to the outlier. The I/O metric aggregation component 210 may then, at (6), select a set of I/O metric information that may be retained for further analysis based at least in part on the detected outliers. For example, after a trace has been tagged as an outlier, the I/O metric aggregation component 210 may determine to store the primary identifier assigned to the trace, the set of aggregated I/O metrics generated for the trace, the secondary identifiers assigned to spans associated with the trace, and the sets of I/O metrics corresponding to the spans. The I/O metric aggregation component 210 may, in some embodiments, determine that I/O metric information may be stored for a subset of outliers. The I/O metric aggregation component 210 may select, for example, every Nth outlier, the first outlier detected in a particular time interval, a randomly selected outlier, or may make selections using a formula based at least in part on the frequency of outlier detection. The I/O metric aggregation component 210 may further combine any of these approaches to selecting a subset of outliers whose I/O metrics may be stored.

Having selected a set of I/O metric information, the I/O metric aggregation component 210 may, at (7), write the selected I/O metric information to the memory buffer 212. The memory buffer 212 may be sized to contain an amount of I/O metric information. Illustratively, the memory buffer 212 may be statically allocated with a fixed number of data structures. These data structures may, in some embodiments, correspond to traces, spans, sets of I/O metrics, and sets of aggregated I/O metrics. In other embodiments, the memory buffer 212 may dynamically allocate memory. For example, the memory buffer 212 may monitor and analyze the quantity of information written by the I/O metric aggregation component 210, and may increase or decrease its size accordingly to prevent data loss or conserve memory. The memory buffer 212 may further manage the creation, deletion, initialization, and recycling of data structures to efficiently manage memory.

Still further, the memory buffer 212 may be implemented as a ring buffer. As described in detail above, a ring buffer is a memory allocation scheme where buffer overflow is prevented by deleting the oldest item in the buffer to make space for the newest item. The memory buffer 212 may therefore utilize a ring buffer allocation scheme to preserve the more recently written I/O metric information. Although the present disclosure may describe the size of the memory buffer 212 as determining the amount of I/O metric information to be stored, one skilled in the art will appreciate that the rate at which the I/O metric service 140 retrieves information from the memory buffer 212 is the actual limiting factor, and therefore that the size of the memory buffer 212 determines the subset of I/O metric information that may be received by the I/O metric service 140 when the I/O metric aggregation component 210 selects and writes large quantities of data within short time intervals.

The I/O metric service 140 may be configured, at (8), to retrieve I/O metric information from the memory buffer 212. Illustratively, retrieval of I/O metric information may be carried out by the storage volume interface 202 of the I/O metric service 140. The I/O metric service 140 may operate asynchronously from the agent 136. That is, the timing and quantity of information retrieved by the I/O metric service 140 may not correspond to the timing and quantity of information written by the I/O metric aggregator component 210. Illustratively, the I/O metric service 140 may throttle its resource utilization, e.g. by limiting the quantity of data retrieved within a specified time interval, or by limiting disk utilization. The I/O metric service 140 may further direct the memory buffer 212 to release or recycle memory associated with the retrieved I/O metric information. Although not shown in FIG. 4B, the I/O metric service 140 may subsequently make I/O metric information available to, for example, client computing devices 150 or virtual machines 112.

Illustratively, interactions (2) and (3) of FIG. 3A may correspond to interaction (1) of FIG. 4A, interaction (4) of FIG. 3A may correspond to interaction (3) of FIG. 4A, interaction (1) of FIG. 3B may correspond to interactions (1) through (6) of FIGS. 4A and 4B, and interaction (2) of FIG. 3B may correspond to interactions (7) and (8) of FIG. 4B. Although FIGS. 4A and 4B illustrate a particular embodiment, one skilled in the art will appreciate that embodiments of the present disclosure include multiple interactions for collecting, determining, and storing I/O metric information associated with outliers. For example, in some embodiments, the outlier detection component 208 may transmit I/O metric information to the I/O metric service 140, client computing devices 150, virtual machines 112, etc. As a further example, in some embodiments, interactions for collecting, determining, and storing I/O metric information associated with outliers may be performed by the I/O metric service 140 rather than the agent 136.

Figure 5:
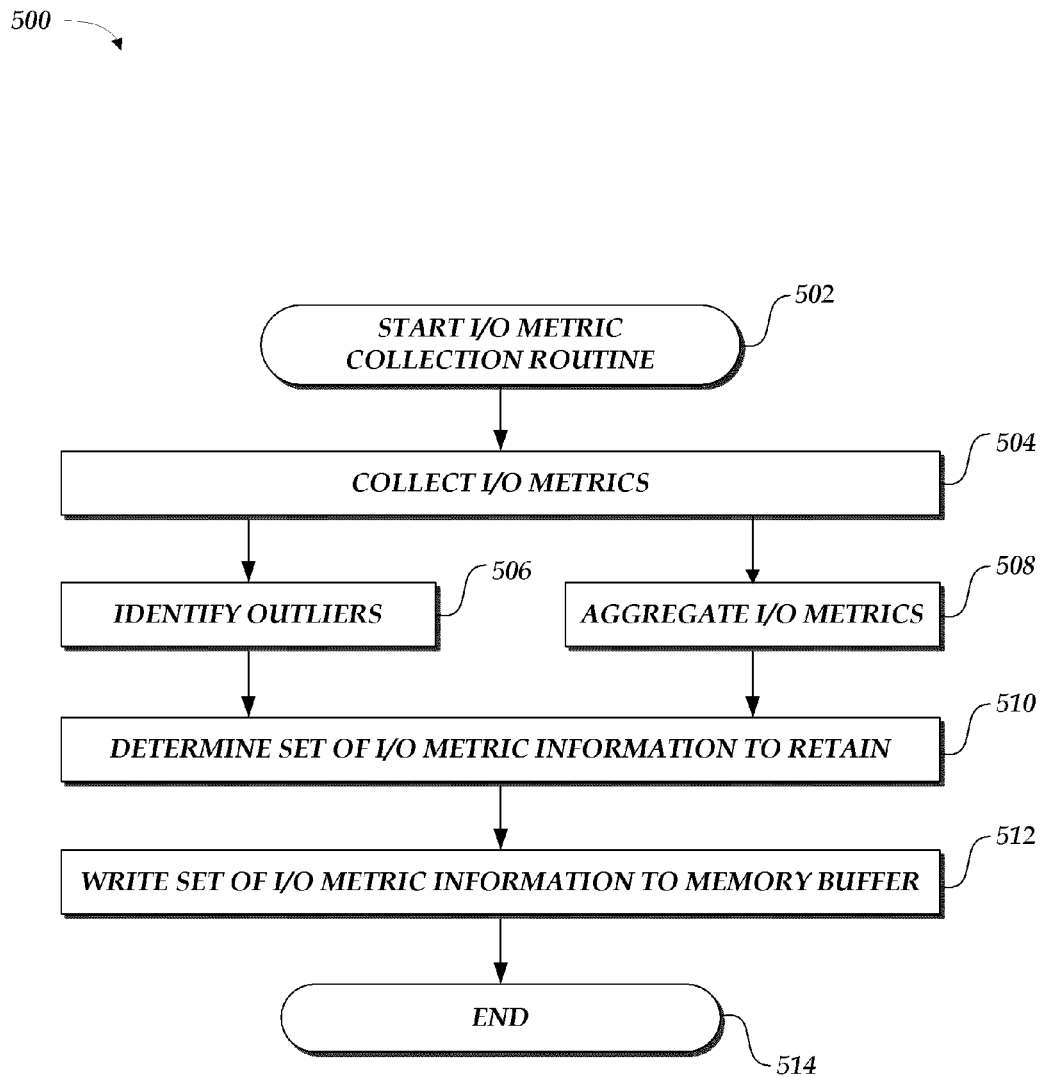
FIG. 5 is a flow diagram depicting an illustrative I/O metric collection routine including dynamic outlier detection implemented by a storage volume agent.

With reference now to FIG. 5, one illustrative routine 502 for detection of I/O metric outliers and selection of relevant I/O metric information will be described. The illustrative routine 502 may be carried out, for example, by the agents 136 of FIG. 1. In some embodiments, blocks of the illustrative routine 502 may be carried out by the I/O metric service 140 of FIG. 1.

At block 504, a number of I/O metrics may be collected. The I/O metrics may be collected, for example, from a storage volume network 130. Illustratively, the I/O metrics may be collected for spans. The I/O metrics for a span may include the time required to complete an operation, events that occurred during the operation (e.g., whether a read operation failed or was throttled, etc.), relevant information about the operation (e.g., the type of storage volume 134, the quantity of data, etc.), and other relevant measurements.

Thereafter, at block 506, one or more outliers may be identified. As described in detail above, outliers may be identified by determining that an I/O metric exceeds a threshold, by sorting I/O metrics into "buckets" of predefined range and identifying metrics in a particular bucket as outliers, by sorting I/O metrics into buckets that are dynamically defined based at least in part on previously collected I/O metrics, or by any combination of these approaches. Illustratively, an outlier may be identified by comparing the time required to complete an operation to a predetermined threshold value, and determining that the time required exceeded the threshold.

At block 508, I/O metrics may be aggregated to produce aggregated I/O metrics. Illustratively, aggregated I/O metrics may include I/O metrics for traces based on the I/O metrics of the corresponding spans. Aggregated I/O metrics may further include I/O metrics aggregated across spans. For example, I/O metrics for throttling operations may be grouped to produce a set of aggregate I/O metrics. Aggregated I/O metrics may include summary statistics such as, for example, the sample size, minimum, maximum, mean, median, and standard deviation of the aggregated metrics. Aggregated I/O metrics may further include percentage calculations. In some embodiments, percentages may be approximated using techniques known to those skilled in the art, as described above. Further, in some embodiments, outliers may be identified based on the aggregated I/O metrics. One skilled in the art will appreciate that, although illustrative routine 502 depicts blocks 506 and 508 as being carried out in parallel, blocks 506 and 508 do not depend on one another and thus may be carried out in any order.

Thereafter, at block 510, the set of I/O metric information to retain for later storage may be determined. In some embodiments, the set of I/O metric information to retain may be predetermined. For example, the set of I/O metric information to retain when a trace is determined to be an outlier may include the trace, the aggregated I/O metrics for the trace, the spans associated with the trace, and the I/O metrics for each span. In other embodiments, the set of I/O metric information to retain may be determined dynamically based on, for example, the quantity of information collected in the recent past for similar outliers. The set of I/O metric information to retain may further be based on the type of metric (e.g., time, quantity, etc.), the type of trace (read requests, write requests, etc.), the type of span (read operations, waiting in queues, etc.), the type of outlier detection (e.g., crossing a threshold, dynamically determined bucket, etc.), or any other criteria. One skilled in the art will also appreciate, by reviewing the whole of illustrative routines 502 and 602, that the set of I/O metric information ultimately retained may be less than the set of I/O information determined at block 510.

At block 512, the retained I/O metric information may be written to memory. As described in detail above, the memory may be the memory buffer 212 as illustrated in FIG. 2B, and may be structured as a ring buffer of predetermined size or, in alternative embodiments, of dynamically determined size. Thereafter, at block 514, the illustrative routine 502 ends. As will be readily apparent to one skilled in the art, the present disclosure is not limited to illustrative routine 502 and includes several alternative embodiments. For example, in some embodiments, block 510 may be omitted and, at block 512, the full set of I/O metric information collected at block 504 may be written to memory. In other embodiments, at block 512, I/O metric information may be written to a storage medium rather than writing to memory.

Figure 6:
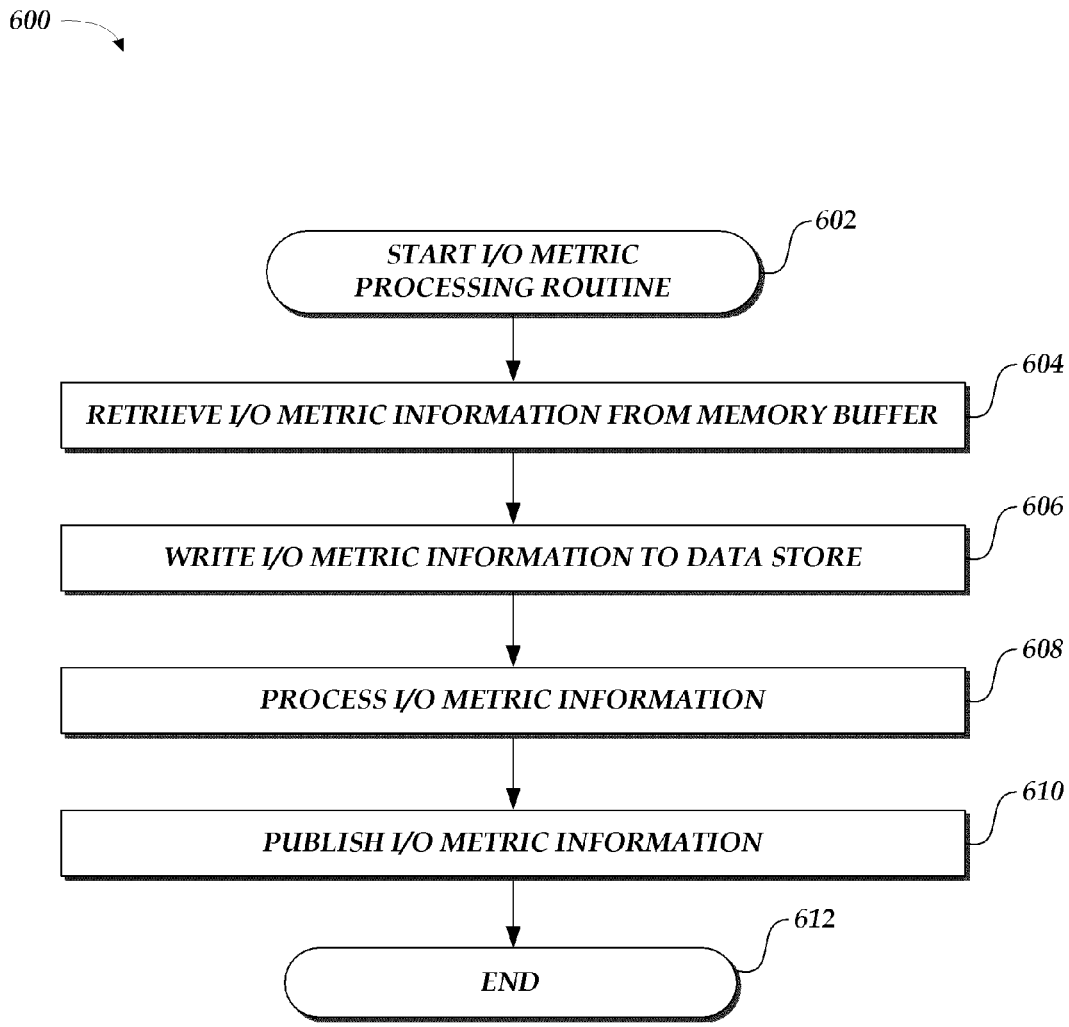
FIG. 6 is a flow diagram depicting an illustrative I/O metric processing routine implemented by an I/O metric service.

With reference now to FIG. 6, one illustrative routine 602 for publication of I/O metric information will be described. The illustrative routine 602 may be carried out, for example, by the I/O metric service 140 of FIG. 1. In some embodiments, blocks of the illustrative routine 602 may be carried out by the agents 136 of FIG. 1.

At block 604, I/O metric information may be retrieved from memory. Illustratively, the retrieval may be carried out by a storage volume interface 202 as shown in FIG. 2A, and the memory may be a memory buffer 212 as illustrated in FIG. 2B. As described above with reference to FIG. 4B, I/O metric information may be retrieved from memory asynchronously. As further described above, the I/O metric information may be stored in memory only for a limited time, and thus the information retrieved at block 604 of illustrative routine 602 may not correspond to the information written at block 512 of illustrative routine 502.

Once retrieved from memory, the I/O metric information may, at block 606, be written to a data store. The data store may correspond to any persistent or substantially persistent storage medium, such as one or more hard disk drives (HDDs), solid state drives (SSDs), or network attached storage devices (NASs). At block 608, the stored I/O metric information may be processed. As described above with reference to FIG. 3B, I/O metric information may be processed, for example, with respect to a certain entity perspective (i.e., from the perspective of a virtual machine instance 112), to provide real-time or near-real-time statistics on the performance of the storage volume network 130 of FIG. 1, to relate various I/O operations or entities with each other, and/or a combination of these approaches.

At block 610, I/O metric information may be published. As described above, I/O metric information may be published to various entities or operators, such as a requesting client computing device 150 or a data center operator. In some embodiments, I/O metric information may be published on a periodic basis, for example as hourly or daily performance statistics. Further, I/O metric information may be published on demand. Illustratively, I/O metric information about a storage volume 134 may be published in response to a query from a data center operator regarding the performance of the storage volume 134. Thereafter, at block 612, the illustrative I/O metric publication routine 602 ends. As one skilled in the art will appreciate, routine 602 illustrates a particular embodiment and is not limiting with regard to the present disclosure. For example, block 608 may be omitted and I/O metric information may be published in "raw" form at block 610.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
an input/output (I/O) metric service, executed on one or more computing devices, the I/O metric service configured to:
collect a set of I/O metrics for each of a plurality of I/O requests transmitted from a plurality of client computing devices via a communications network;
assign a primary identifier to each of the plurality of I/O requests;
associate one or more secondary identifiers with each primary identifier, wherein the one or more secondary identifiers each correspond to an I/O operation associated with fulfilling the I/O request of the primary identifier;
create a set of aggregated I/O metrics for each primary identifier, based at least in part on the sets of I/O metrics for the associated secondary identifiers;
identify one or more outliers from among the primary identifiers, wherein identifying the one or more outliers comprise:
determining a threshold value based on a comparison of the set of aggregated I/O metrics for each primary identifier; and
identifying an aggregated I/O metric in the set of aggregated I/O metrics for the primary identifier that have exceeded the threshold value as the one or more outliers; and
write, to a ring buffer defining the maximum amount of I/O metric information to be held at once, I/O metric information including one or more of:
the outlier;
the set of aggregated I/O metrics corresponding to the outlier;
the associated set of secondary identifiers; or
the set of I/O metrics for each secondary identifier in the associated set of secondary identifiers.

2. The system of claim 1, wherein the plurality of client computing devices correspond to virtual machine instances instantiated on one or more associated physical computing devices.

3. The system of claim 1, wherein the primary identifier corresponds to a trace and the secondary identifier corresponds to a span.

4. The system of claim 1, wherein the operations associated with fulfilling the I/O request include at least reading from a storage volume or writing to a storage volume.

5. A method comprising:
generating a set of aggregated I/O metrics for each of a plurality of primary identifiers, the set of aggregated I/O metrics corresponding to processing one or more I/O requests by a network resource;
identifying at least one outlier from among the plurality of primary identifiers based on a comparison of the set of aggregated I/O metrics for each of the plurality of primary identifiers; and
storing I/O metric information including one or more of:
the at least one outlier; or
the set of I/O metrics corresponding to the at least one outlier.

6. The method of claim 5, wherein the sets of aggregated I/O metrics for the plurality of primary identifiers are based at least in part on sets of I/O metrics collected for one or more secondary identifiers.

7. The method of claim 6, wherein the one or more secondary identifiers each correspond to an I/O operation associated with fulfilling an I/O request, and wherein the primary identifier corresponds to the I/O request.

8. The method of claim 5, wherein the stored I/O metric information further includes one or more of:
the set of secondary identifiers associated with the at least one outlier; or
the set of I/O metrics for each secondary identifier in the associated set of secondary identifiers.

9. The method of claim 5, wherein identifying at least one outlier comprises comparing a metric to a threshold value.

10. The method of claim 5, wherein identifying at least one outlier comprises:
defining a set of ranges, each range comprising a minimum value and a maximum value;
determining that an I/O metric falls within one of the ranges in the set of ranges; and
selecting the identifier associated with the determined I/O metric.

11. The method of claim 10, wherein the number of ranges in the set of ranges is predetermined.

12. The method of claim 10, wherein the number of ranges in the set of ranges is determined dynamically, based at least in part on previously generated sets of aggregated I/O metric information.

13. The method of claim 10, wherein the minimum and maximum values of reach range are determined dynamically, based at least in part on previously generated sets of aggregated I/O metric information.

14. A non-transitory computer-readable storage medium including computer-executable instructions that, when executed by one or more client computing devices, cause the one or more client computing devices to:

collect a set of metrics for each of one or more identifiers, the set of metrics corresponding to processing a plurality of network-based I/O requests;

create a set of metrics for each of a plurality of primary identifiers, wherein creating a set of metrics for each of the plurality of primary identifiers comprises aggregating metrics for the collected set of metrics for each of the one or more identifiers;

identify an outlier metric from among the sets of metrics based on a comparison of the sets of metrics for each of a plurality of primary identifiers; and store a set of metric information associated with the outlier metric.

15. The non-transitory computer-readable storage medium of claim 14, wherein the primary identifiers correspond to I/O requests, wherein the identifiers correspond to I/O operations associated with fulfilling the I/O requests, and wherein the identifiers are associated with the primary identifiers based on the I/O requests.

16. The non-transitory computer-readable storage medium of claim 14, wherein the stored set of metric information includes one or more of:

the set of metrics that include the outlier metric;

an identifier associated with the outlier metric;

a primary identifier associated with the outlier metric;

the set of identifiers associated with the primary identifier;

the set of metrics for each identifier in the associated set of identifiers; or the set of aggregated metrics corresponding to the primary identifier.

17. The non-transitory computer-readable storage medium of claim 14, wherein identifying an outlier metric comprises comparing a metric to a threshold value.

18. The non-transitory computer-readable storage medium of claim 14, wherein identifying an outlier metric comprises:

defining a set of ranges, each range comprising a minimum value and a maximum value;

determining that a metric falls within one of the ranges in the set of ranges; and identifying the determined metric as an outlier metric.

19. The non-transitory computer-readable storage medium of claim 18, wherein the number of ranges in the set of ranges is predetermined.

20. The non-transitory computer-readable storage medium of claim 18, wherein the number of ranges in the set of ranges is determined dynamically, based at least in part on previously collected metrics.

21. The non-transitory computer-readable storage medium of claim 18, wherein the minimum and maximum values of reach range are determined dynamically, based at least in part on previously collected metrics.

22. The non-transitory computer-readable storage medium of claim 14, wherein the instructions causing the client computing devices to create a set of metrics for each of a plurality of primary identifiers and the instructions causing the client computing devices to identify an outlier metric from among the sets of metrics are executed in parallel.

23. The non-transitory computer-readable storage medium of claim 14, wherein the instructions causing the client computing devices to create a set of metrics for each of a plurality of primary identifiers and the instructions causing the client computing devices to identify an outlier metric from among the sets of metrics are executed in series.

24. The non-transitory computer-readable storage medium of claim 14, wherein storing a set of metric information associated with the outlier metric comprises sending the set of metric information to an I/O metric service.

* * * * *